United States Patent
Coulson et al.

(10) Patent No.: US 9,694,520 B2
(45) Date of Patent: Jul. 4, 2017

(54) METHOD OF MANUFACTURING PORTABLE ELECTRONIC DEVICE

(75) Inventors: Simon Coulson, Hamilton (CA); Steven Andrew Prsa, Kitchener (CA); William Stephen Steinoff, Plantation, FL (US); Dietmar Frank Wennemer, Waterloo (CA)

(73) Assignee: BlackBerry Limited, Waterloo, Ontario (CA)

(*) Notice: Subject to any disclaimer, the term of this patent is extended or adjusted under 35 U.S.C. 154(b) by 1554 days.

(21) Appl. No.: 13/357,011

(22) Filed: Jan. 24, 2012

(65) Prior Publication Data

US 2012/0118492 A1 May 17, 2012

Related U.S. Application Data

(63) Continuation of application No. 12/910,604, filed on Oct. 22, 2010, now Pat. No. 8,618,415.

(51) Int. Cl.
| | |
|---|---|
| *B29C 43/02* | (2006.01) |
| *B29C 45/14* | (2006.01) |
| *H04M 1/02* | (2006.01) |
| B29K 105/06 | (2006.01) |
| B29K 105/08 | (2006.01) |

(52) U.S. Cl.
CPC ........ *B29C 43/02* (2013.01); *B29C 45/14336* (2013.01); *B29C 45/14786* (2013.01); *B29K 2105/06* (2013.01); *B29K 2105/0872* (2013.01); *H04M 1/0202* (2013.01); *Y10T 29/49002* (2015.01); *Y10T 156/10* (2015.01)

(58) Field of Classification Search
CPC .............. B29C 43/02; B29C 45/14336; B29C 45/14786; Y10T 156/10; Y10T 29/49002; Y10T 29/49016; Y10T 29/49018; B29K 2105/06; B29K 2105/0872; H04M 1/0202; H01Q 1/40; H01Q 1/243
See application file for complete search history.

(56) References Cited

U.S. PATENT DOCUMENTS

| | | |
|---|---|---|
| 5,164,542 A | 11/1992 | Hart |
| 6,051,307 A | 4/2000 | Kido et al. |
| 6,400,571 B1 | 6/2002 | Kimura et al. |
| 6,487,073 B2 | 11/2002 | McCullough et al. |
| 6,868,602 B2 | 3/2005 | McCullough |
| 6,900,984 B2 | 5/2005 | Merz et al. |
| 6,905,768 B2 | 6/2005 | Tada et al. |

(Continued)

FOREIGN PATENT DOCUMENTS

| | | | |
|---|---|---|---|
| CN | 101437057 A | * | 5/2009 |
| EP | 1219401 A2 | | 7/2002 |

(Continued)

OTHER PUBLICATIONS

Machine Translation of JP2009202580A, obtained Feb. 20, 2016.*

(Continued)

*Primary Examiner* — Livius R Cazan
(74) *Attorney, Agent, or Firm* — Conley Rose, P.C.; J. Robert Brown, Jr.; Albert A. Abbou

(57) ABSTRACT

A method of manufacturing a portion of a portable electronic device includes forming a fibrous laminate sheet to provide a laminate body, and connecting a rim with the body. The rim includes a connector for coupling with a complementary part.

13 Claims, 10 Drawing Sheets

(56) References Cited

U.S. PATENT DOCUMENTS

| | | | |
|---|---|---|---|
| 6,967,833 | B2 | 11/2005 | Boykin et al. |
| 6,996,425 | B2 | 2/2006 | Watanabe |
| 7,012,189 | B2 | 3/2006 | Kriege et al. |
| 7,019,967 | B2 | 3/2006 | DiFonzo et al. |
| 7,153,576 | B2 | 12/2006 | Wang et al. |
| 7,301,761 | B2 | 11/2007 | Merz et al. |
| 7,457,111 | B2 | 11/2008 | Merz et al. |
| 7,636,244 | B2 | 12/2009 | Kriege et al. |
| 7,688,574 | B2 | 3/2010 | Zadesky et al. |
| 7,711,400 | B2 | 5/2010 | Nuovo |
| 7,824,770 | B2 | 11/2010 | Honma et al. |
| 7,835,147 | B2 | 11/2010 | Merz et al. |
| 7,907,400 | B2 | 3/2011 | Bekele |
| 7,947,900 | B2 | 5/2011 | Cheng et al. |
| 8,322,560 | B2 | 12/2012 | Jiang et al. |
| 2005/0117292 | A1 | 6/2005 | DiFonzo et al. |
| 2005/0242471 | A1 | 11/2005 | Bhatt et al. |
| 2006/0204731 | A1 | 9/2006 | Wani et al. |
| 2007/0109737 | A1 | 5/2007 | Kriege et al. |
| 2007/0165373 | A1 | 7/2007 | Merz et al. |
| 2008/0032093 | A1 | 2/2008 | Deng et al. |
| 2009/0040698 | A1 | 2/2009 | Merz et al. |
| 2009/0110872 | A1 | 4/2009 | DiFonzo et al. |
| 2009/0136708 | A1 | 5/2009 | Huang et al. |
| 2009/0208721 | A1* | 8/2009 | Tsuchiya ............ B29C 45/14786 428/220 |
| 2009/0233044 | A1 | 9/2009 | Sun et al. |
| 2010/0050556 | A1 | 3/2010 | Burns |
| 2010/0119634 | A1 | 5/2010 | Choiniere et al. |
| 2010/0283706 | A1* | 11/2010 | Tsao .................. B29C 45/14639 343/872 |
| 2011/0128462 | A1 | 6/2011 | Lin et al. |
| 2011/0188180 | A1 | 8/2011 | Pakula et al. |
| 2011/0318592 | A1* | 12/2011 | Wu .................. B29C 45/14336 428/464 |

FOREIGN PATENT DOCUMENTS

| | | |
|---|---|---|
| EP | 1841185 A2 | 10/2007 |
| EP | 2047983 A1 | 4/2009 |
| EP | 2047983 A2 | 4/2009 |
| EP | 2100719 A1 | 9/2009 |
| JP | 2009090475 A | 4/2009 |
| JP | 2009202580 A * | 9/2009 |
| WO | 2010127749 A1 | 11/2010 |

OTHER PUBLICATIONS

Office Action; U.S. Appl. No. 12/910,604; Filing Date Oct. 22, 2010; Notification Date Jan. 16, 2013; 22 pages.

Extended European Search Report; European Application No. 10188616.6-2307; Extended European Filing Date Apr. 4, 2011; Date of Mailing Apr. 27, 2011; 7 pages.

Wennemer, Dietmar Frank, et al.; U.S. Appl. No. 12/910,604, filed Oct. 22, 2010; Title: Portable Electronic Device and Method of Manufacturing Parts Thereof.

Marek, Sue; "Nokia Unveils Fancy Carbon Fiber Phone"; Fierce Wireless; http://www.fiercewireless.com/story/nokia-unveils-fancy-carbon-fiber-phone/2008-08-19; Aug. 19, 2008; 3 pages.

Toyobo; "Toyobo Develops JF-30G Glass-fiber Reinforced Nylong Resin with World-class Strenth, Modulus and Impact Resistance"; http://www.toyobo.co.jp/e/press/press14052009.htm; Mar. 18, 2009; 2 pages.

Alibaba; "Mobile Phone Protective Covers"; http://www.alibaba.com/product-free/108371236/mobile_phone_protective_covers.html; Feb. 24, 2010; 3 pages.

Switched; "LG's Sexy New Phone Offers Glass, Carbon Fiber, Mystique"; http://www.switched.com/2008/04/08/lgs-sexy-new-phone-offers-glass-carbon-fiber-mystique/; Apr. 8, 2008; 12 pages.

Bond Laminates; "TEPEX Materials, Properties, and Processes"; http://www.bond-laminates.de/en/index.php?nav=3.02; Feb. 9, 2010; 8 pages.

"LG Electronics Chocolate KU800 Cell Phone"; http://www2.electronicproducts.com/LG_Electronics_Chocolate_KU800_Cell_Phone-whatsinside_text-55.aspx; Jan. 22, 2010; 4 pages.

Final Office Action dated May 23, 2013; U.S. Appl. No. 12/910,604, filed Oct. 22, 2010; 8 pages.

Advisory Action dated Jul. 26, 2013; U.S. Appl. No. 12/910,604, filed Oct. 22, 2010; 3 pages.

Notice of Allowance dated Aug. 21, 2013; U.S. Appl. No. 12/910,604, filed Oct. 22, 2010; 9 pages.

Canadian Office Action; Application No. 2,756,319; Jun. 4, 2013; 3 pages.

European Examination Report; Application No. 10188616.6; Jul. 2, 2015; 4 pages.

European Examination Report; Application No. 10188616.6; Feb. 3, 2016; 4 pages.

European Examination Report; Application No. 10188616.6; Aug. 17, 2016; 4 pages.

European Examination Report; Application No. 10188616.6; Mar. 28, 2017; 5 pages.

* cited by examiner

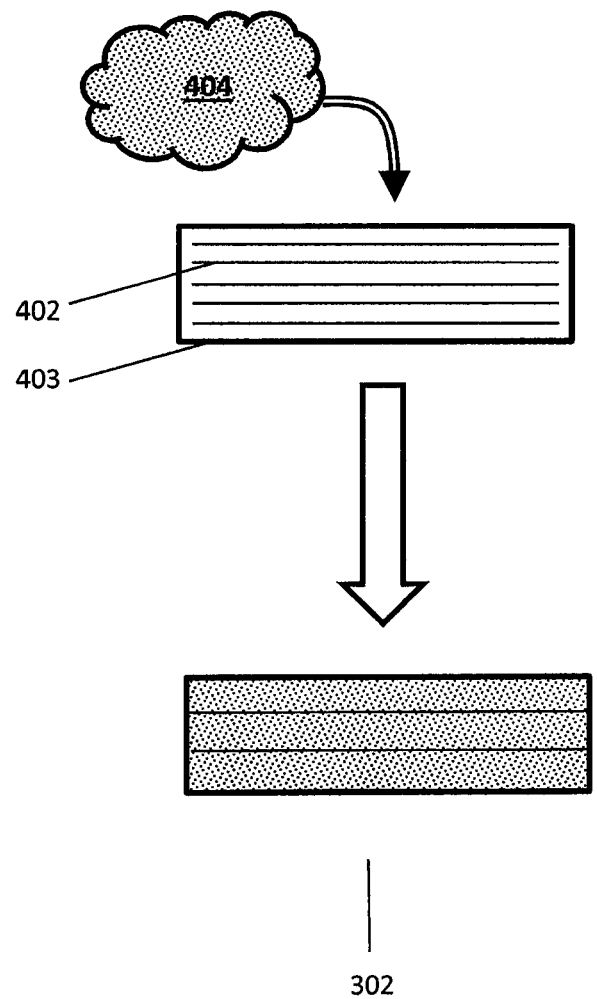

METHOD OF MANUFACTURING PORTABLE ELECTRONIC DEVICE

CROSS-REFERENCE TO RELATED APPLICATIONS

The present application claims the benefit of priority of co-pending application Ser. No. 12/910,604, now U.S. Pat. No. 8,618,415, entitled "Portable Electronic Device and Method of Manufacturing Parts Thereof," which was filed on Oct. 22, 2010, the entire contents of which are incorporated herein by reference.

BACKGROUND

The present disclosure relates to portable electronic devices and a method of manufacturing parts thereof.

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless 702.11 or Bluetooth capabilities.

Portable electronic devices such as PDAs or smart telephones are generally intended for handheld use and ease of portability. Smaller devices are generally desirable for portability. With increased functionality and features included in portable electronic devices, further reduction in size of components is desirable to maintain or further reduce the overall size of portable electronic devices.

BRIEF DESCRIPTION OF THE DRAWINGS

Embodiments of the present disclosure will now be described, by way of example only, with reference to the attached figures, wherein:

FIG. 16 is a plan view illustrating an alternative method of forming a portable electronic device.

DETAILED DESCRIPTION

Figure 1:
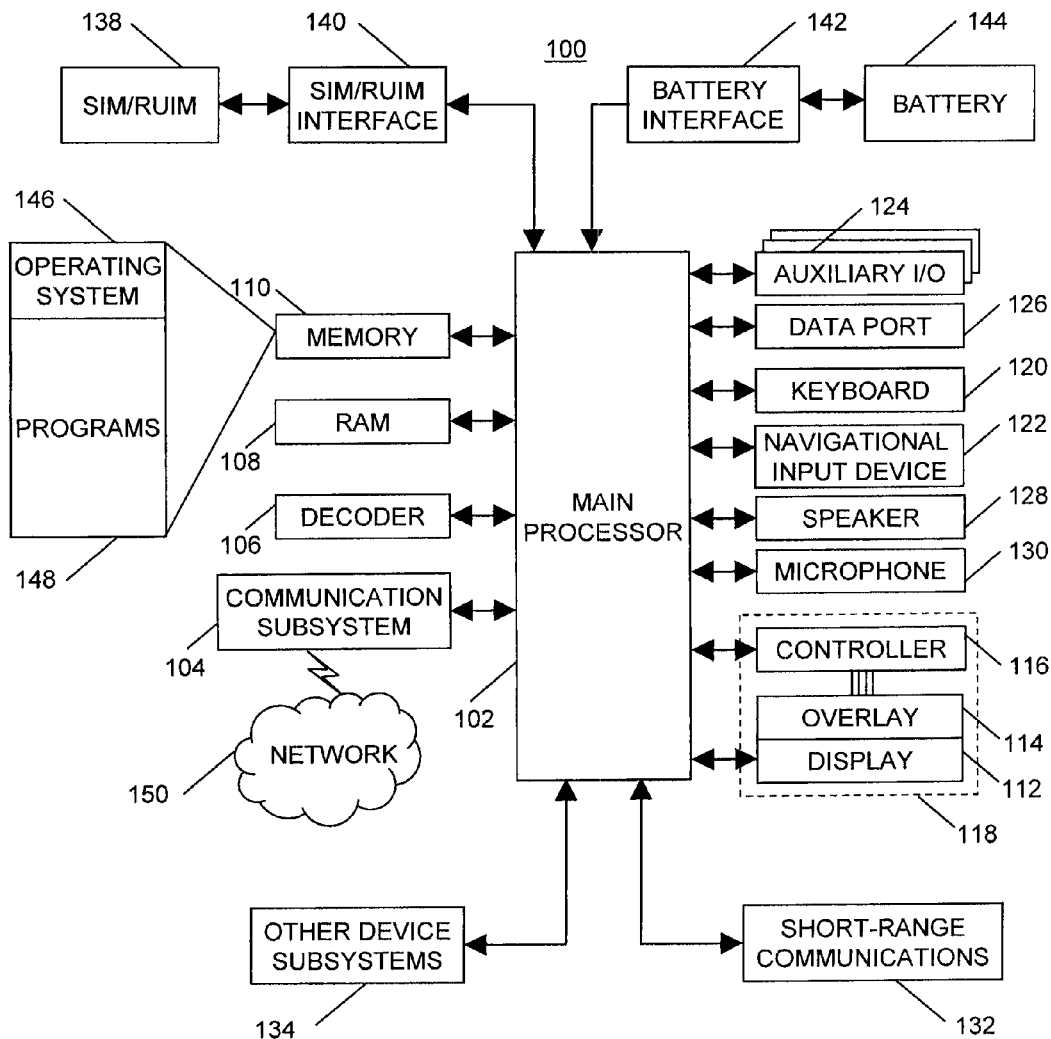
FIG. 1 is a block diagram of a portable electronic device in accordance with one example.

The following describes a portable electronic device and method of manufacturing a portion of the portable electronic device. The method includes forming a glass fiber laminate sheet to provide a formed glass fiber laminate body, and overmolding a rim on the body. The rim includes a connector for coupling with a complementary part of the portable electronic device.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring first to FIG. 1, a block diagram of components of one example of a portable electronic device 100 is shown. The portable electronic device 100 includes multiple components such as a processor 102 that controls the operations of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. The portable electronic device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, a keyboard 120, a navigational input device 122 such as an optical trackpad, a trackball or other similar navigation device, an auxiliary input/output (I/O) subsystem 124, a data port 126, a speaker 128, a microphone 130, short-range communications 132 and other device subsystems 134. User-interaction with the graphical user interface may be performed utilizing the touch-sensitive display 118. The processor 102 interacts with the touch-sensitive overlay 114 via the electronic controller 116. Information, such as text, characters, symbols, images, icons, and other features that may be displayed or rendered on a portable electronic device, are displayed on the display 112, via the processor 102. The display 112 may also be a non-touch, 3D or other type of display.

To identify a subscriber for network access according to the present embodiment, the portable electronic device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The portable electronic device 100 also includes an operating system 146 and software components or programs 148 that are executed by the processor 102 and are typically stored in a persistent store such as flash memory 110. Additional applications may be loaded onto the portable electronic device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

Figure 2A:
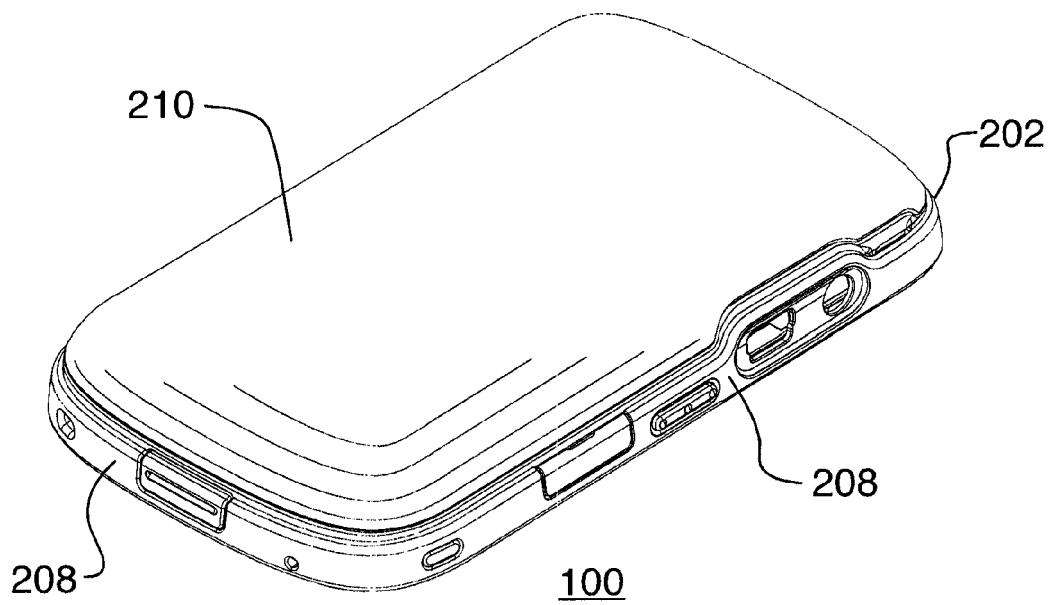
FIG. 2A and FIG. 2B are perspective views of a portable electronic device in accordance with an example.
Figure 2B:
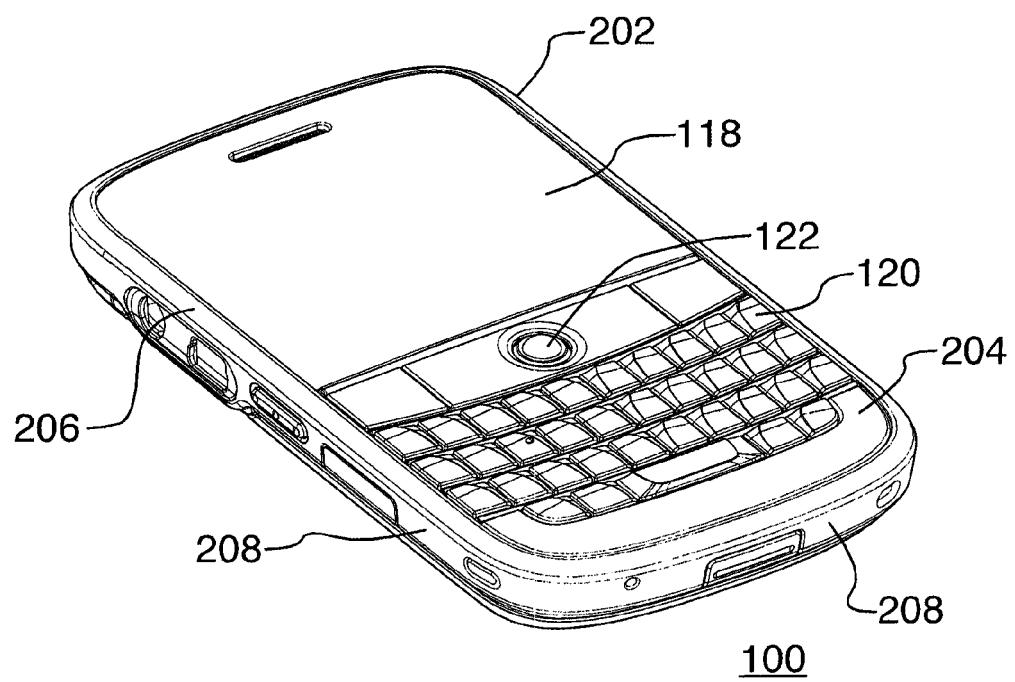

Reference is now made to FIG. 2A and FIG. 2B, which shows a perspective view of an example of the portable electronic device 100. The portable electronic device 100 includes a housing 202 that houses the internal components that are shown in FIG. 1 and frames the touch-sensitive display 118 such that the touch-sensitive display 118, the keyboard 120, and the navigational input device 122 are exposed for user-interaction when the portable electronic device 100 is in use.

The housing 202 may be any suitable housing for the internal components shown in FIG. 1. The housing 202 in the present example includes a front 204. The front 204 includes a frame 206 that frames the touch-sensitive display 118. The housing 202 also includes sidewalls 208 that extend between the front 204 and a back 210. The housing 202 may be injection molded, for example. In the example of the portable electronic device 100 shown in FIG. 2A and FIG. 2B, the frame 206 is generally rectangular although other shapes may be utilized.

Figure 3:
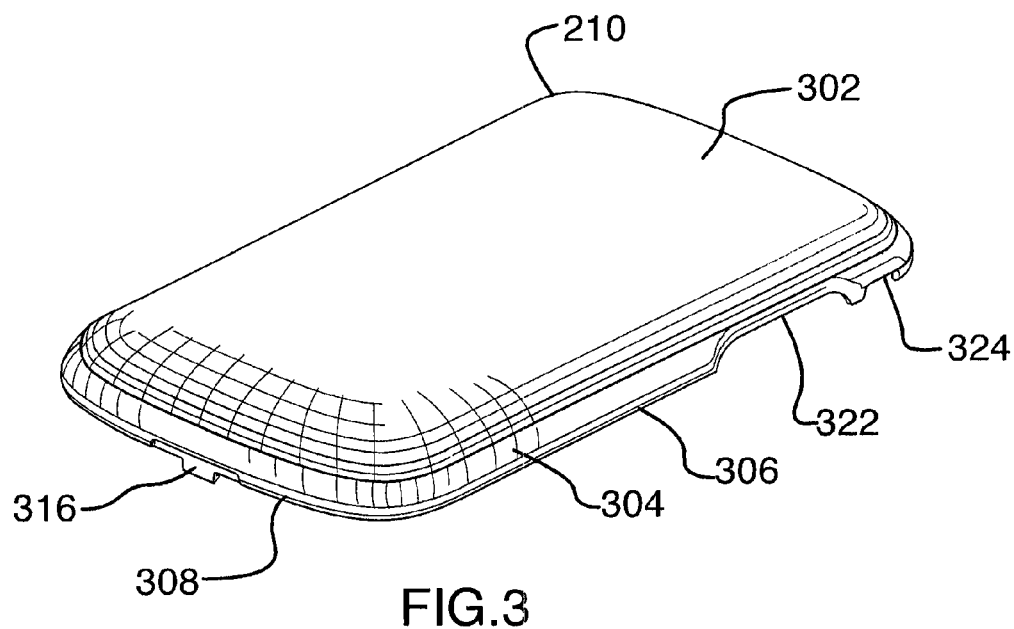
FIG. 3 is a perspective view of a back of the portable electronic device of FIG. 2A.
Figure 4:
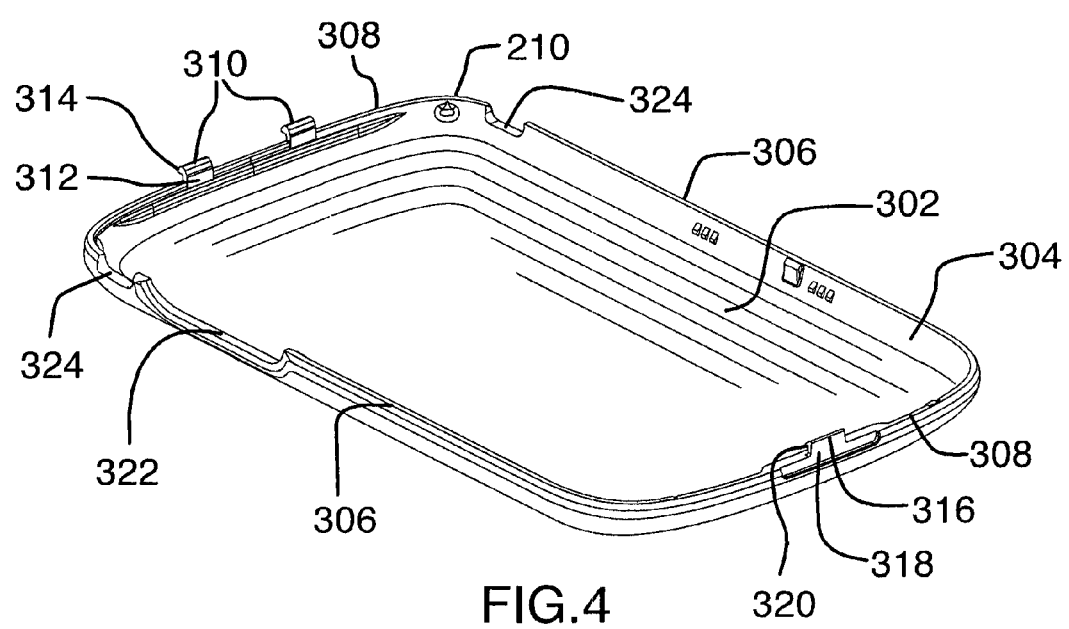
FIG. 4 is an alternative perspective view of a back of the portable electronic device of FIG. 2A.
Figure 5:
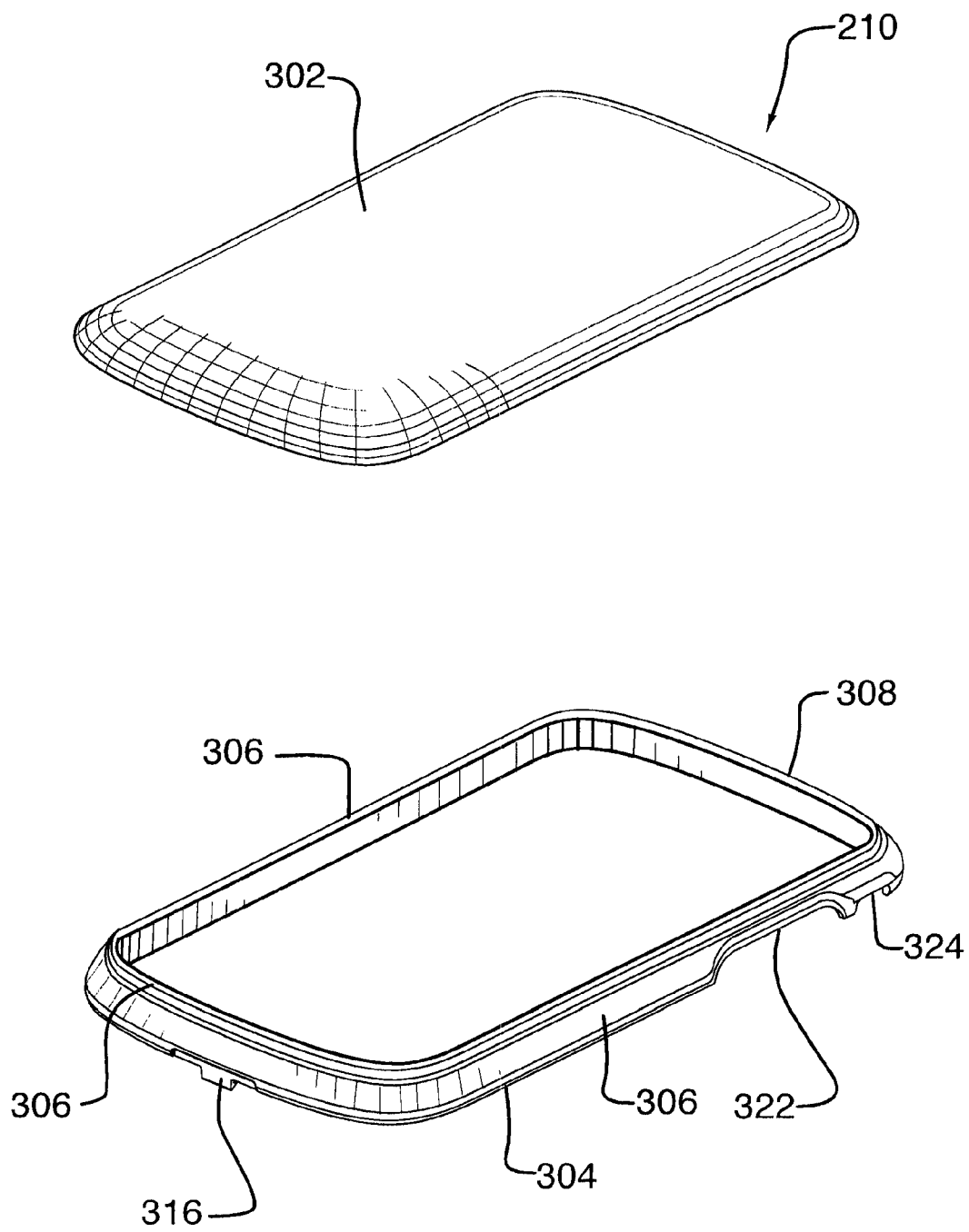
FIG. 5 is an exploded perspective view of the back of the portable electronic device of FIG. 2A.

Referring now to FIG. 3, FIG. 4, and FIG. 5, the back 210 includes a body 302 that is generally rectangular in shape with curved edges to form a generally rectangular bowl. The body 302 is formed from a fibrous material, including one or more of glass fiber, carbon fiber or another type of fiber having similar properties, such as nylon, where the fibers may be for example uni-directional, woven and/or provided in strands. In accordance with one embodiment, the body 302 may be made of glass fiber laminate including a glass woven fabric in a matrix material of thermoset and/or thermoplastic resins binder. Glass fiber laminate provides mechanical strength, rigidity and dimensional stability at a thickness that may be less than the thickness of a plastic back. Any suitable resin material may be utilized. Any suitable woven glass sheet of suitable thickness may be utilized. The thickness may depend on the mechanical design of the part. The back 210 also includes a rim 304 that is coupled to and extends around the edge of the body 302. The rim 304 is made of a suitable plastic and is thicker than the body to provide a mechanical interlock with the body and to provide mechanical strength. The rim 304 is overmolded to provide features for cooperating with the front 204 to couple the back 210 to the front 204. The plastic utilized for the rim 304 may be dependent on the type of resin used in the laminate. The rim 304 includes long sides 306 and short sides 308 that surround the body 302. Connectors (described in further detail below) extend from the rim 304 to couple the back 210 with the front 204 (shown in FIG. 2A and FIG. 2B) of the portable electronic device 100.

The connectors may include any suitable connectors for coupling the back 210 to the front 204. In the example shown in FIG. 3 and FIG. 4, the connectors are snap-fit connectors that extend from the short sides 308 of the rim 304. One of the short sides 308 includes two snap-fit connectors 310. Each snap-fit connector 310 includes a beam 312 with a lip 314 that extends outwardly, away from the body 302, to insert into a complementary recess (not shown) in the front 204 of the portable electronic device 100 and thereby engage the front 204. The opposing one of the short sides 308 of the rim 304 includes a single snap-fit connector 316 centered along the opposing one of the short sides 308. The snap-fit connector 316 includes a beam 318 with a lip 320 that extends inwardly, generally toward the body 302, to insert into a complementary recess (not shown) in the front 204 of the portable electronic device 100 and thereby engage the front 204. Although a pair of snap-fit connectors 310 are utilized on one of the short sides 308 and a single snap-fit connector 316 is utilized on the opposing one of the shorts sides 308 in the example illustrated, any suitable number of connectors may be utilized. Further, the connectors may be located on any of the sides and other suitable connector types and shapes may be utilized. The connectors facilitate release of the back 210 from the front 204, for example, for insertion and removal of the battery and SIM/RUIM card.

In the example shown in FIG. 3, FIG. 4, and FIG. 5, the rim 304 also defines recesses, with a generally rectangular recess 322 extending along one of the long sides 306. The recess 322 is located to one side of a center of the long side 306, near the short side 308 from which the pair of connectors 310 extends. The recess 322 may be utilized to receive, for example, mechanical buttons that are coupled to the front 204 and fit into the recess 322, when the back 210 is coupled to the front 204 of the portable electronic device 100. The rim 304 may also define additional recesses, such as the recesses 324 on the opposing long sides 306, to accommodate other features such as buttons or to mechanically interlock with complementary features on the front 204 of the portable electronic device 100.

Figure 6:
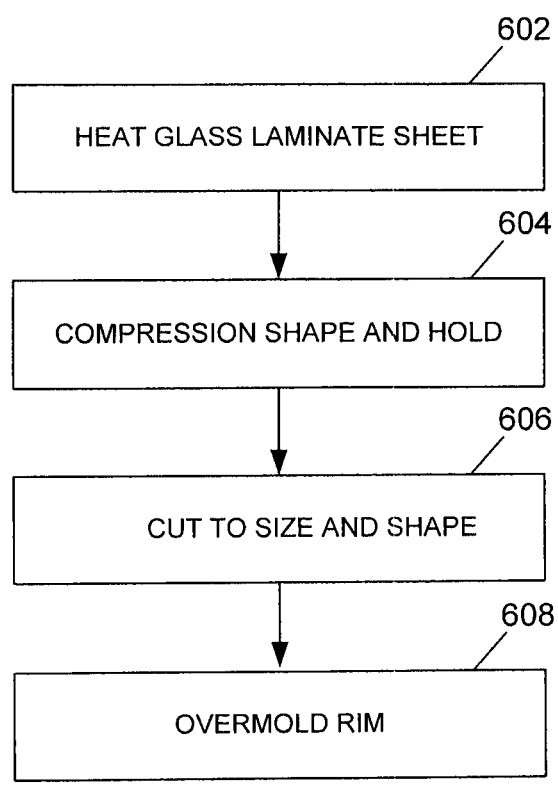
FIG. 6 is a flowchart illustrating a method of manufacturing a back of a portable electronic device.

A flowchart illustrating a method of manufacturing a portion of the portable electronic device 100, such as the back 210, is shown in FIG. 6. The method may contain additional or fewer processes than shown and/or described.

Figure 7:
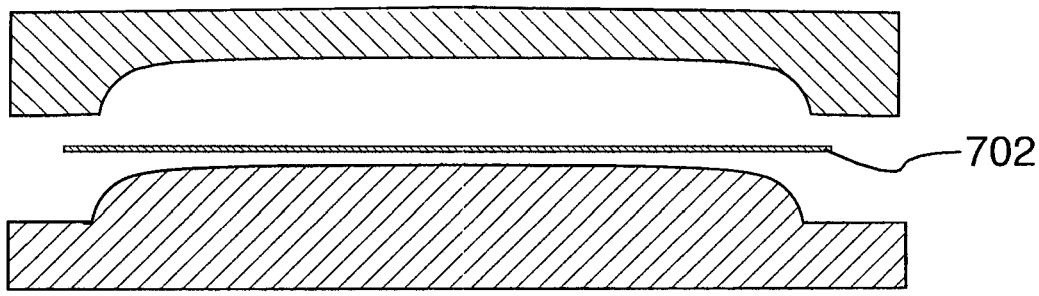
FIG. 7 is a sectional side view of a body of the back and a compression molding tool according to an example.

The back 210 is manufactured utilizing a flat fibrous laminate sheet 702, as shown in FIG. 7, which may include, for example, glass woven fabric in a resin binder although it is to be understood that other types of sheets formed of composite fibrous materials may be used (for purposes of clarity and brevity the example of a glass woven fabric will be used below). A dye or coating may be applied to the glass woven fabric prior to addition of the resin to provide the glass fiber laminate sheet. For example, the glass woven fabric may be dyed utilizing a suitable dye, such as a fabric dye, to provide a dyed glass woven fabric in the resin binder. Dying of the glass woven fabric may be carried out in a continuous dipping process during the manufacture of the glass fiber laminate sheet, or in any other suitable process. Optionally, a coating may be applied to the glass woven fabric, in addition to or in place of the dye. A material and a thickness of the coating may be chosen such that the coating does not interfere substantially with RF or other functions of the portable electronic device 100. In accordance with an exemplary embodiment, the coating may be, for example, a Non-Conductive Vacuum Metalized (NCVM) coating or any other suitable coating.

Figure 8:
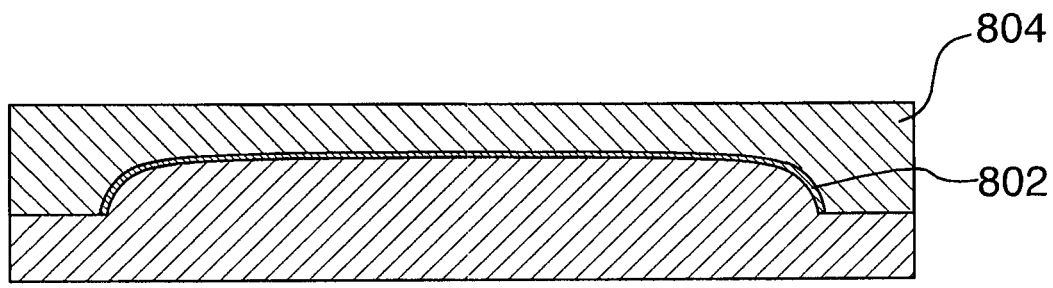
FIG. 8 is a sectional side view of the body in the compression molding tool.
Figure 9:
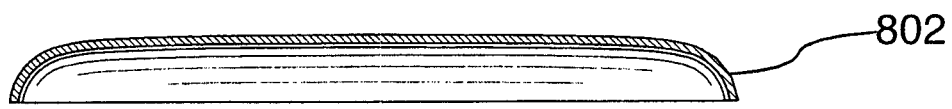
FIG. 9 is a sectional side view of the body after compression molding.

The laminate sheet 702 is formed by heating at 602 and compression shaping at 604 to provide a shaped sheet 802, as shown in FIG. 8. The heating temperature is dependent on the type of resin utilized in the glass fiber laminate sheet. The laminate sheet 702 may be heated prior to placement in the compression tool, or in the compression tool, which may be referred to as thermoforming, or both prior to placement in the compression tool and when in the compression tool. The laminate sheet 702 is shaped by utilizing the compression tool 804 to compress and hold the laminate sheet 702 in the compressed state for a suitable period of time to facilitate setting of the laminate sheet 702 in the compressed shape. The time to facilitate setting of the laminate sheet 702 may be dependent on the resin utilized in the glass fiber laminate sheet. The shaped sheet 802 is then cut to a desired size and shape at 606, for example, utilizing a computer numerical control (CNC) machine to provide the body 302 shown in FIG. 9.

In accordance with alternate embodiments, the laminate sheet 702 may be originally provided as a formed or unformed laminate sheet. In addition, the laminate sheet 702 may be formed by resin transfer molding (RTM) or by epoxy molding. In the epoxy molding case, fibrous materials are pressed into a laminated sheet form or laid into an epoxy molding tool. Epoxy is then injected and formed into a mold, which is cured.

Figure 10:
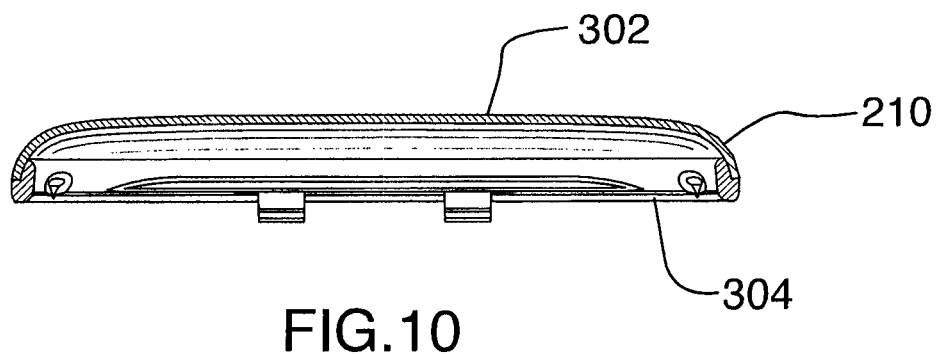
FIG. 10 is a sectional side view of the back.

After cutting, the body 302 is disposed in a molding machine of suitable shape and the rim 304, including the connectors and recesses, is overmolded on the body 302 at 608, to provide the back 210 shown in FIG. 10. The plastic utilized for the rim 304 may be dependent on the type of resin in the laminate sheet 702 and the thickness may be dependent on the device. The plastic rim is bonded to the formed laminate. An activator may be utilized to facilitate bonding. Further, mechanical interlocks and/or application of a texture to the surface of the laminate may also be utilized to facilitate bonding and increase bond strength. The mechanical interlocks may be molded with the rim 304, added separately from the rim 304 by, for example, molding, gluing, being pressed into position, laminated as part of a stack of features such that the mechanical interlocks are provided as a function of the composite shape of the body 302 or the rim 304 and/or snapped to glass. The application of the texture may be provided by emboss/deboss processes.

In accordance with alternate embodiments, overmolding of the rim 304 on the body 302 is not required. Resin, glue, an additional laminate material or some other type of adhesive may be applied to an edge of the body 302 whereby the rim 304 can be affixed to the edge of the body 302. In any case, the overmolding or the alternate examples referred to herein may be provided such that the edge of the body 302 is protected and its structural integrity preserved.

Optionally, leather may be cut to size and fixed to the body 302 using a suitable adhesive to provide a portion of a back with a desirable leather look and feel. The portion of the back is thin by comparison to a leather-covered plastic portion.

Figure 11:
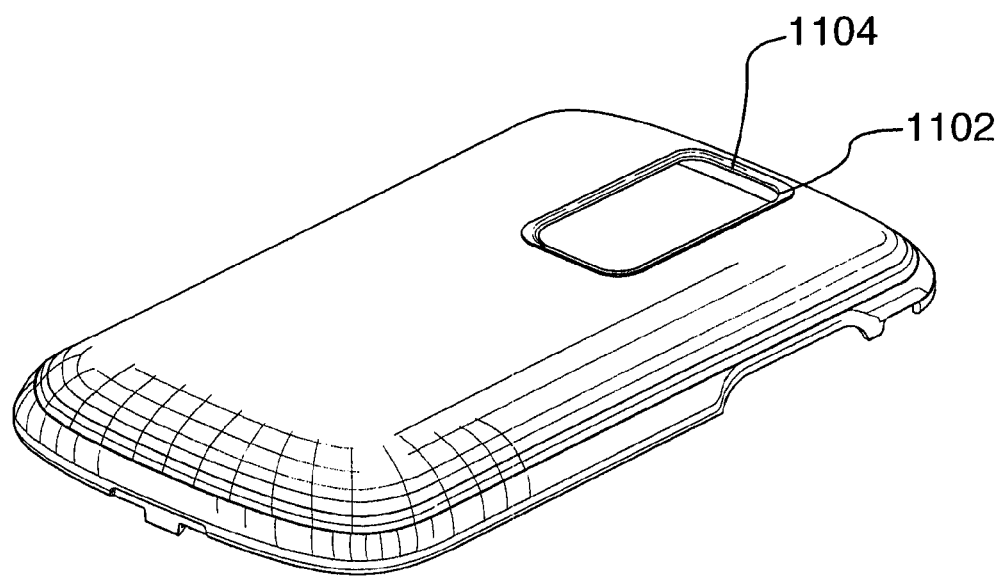
FIG. 11 is a perspective view of another example of a back of a portable electronic device.
Figure 12:
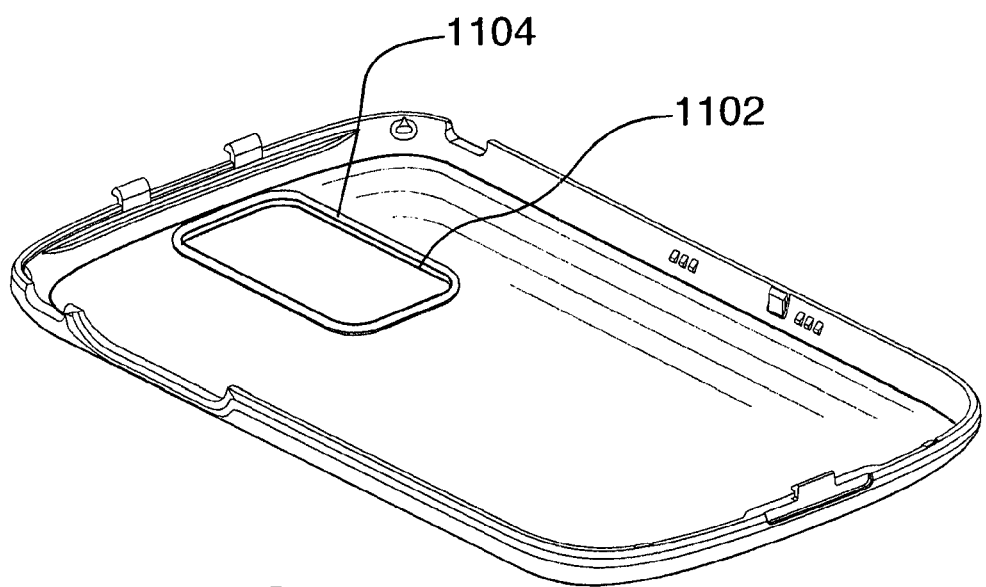
FIG. 12 is an alternative perspective view of another example of a back of a portable electronic device.
Figure 13:
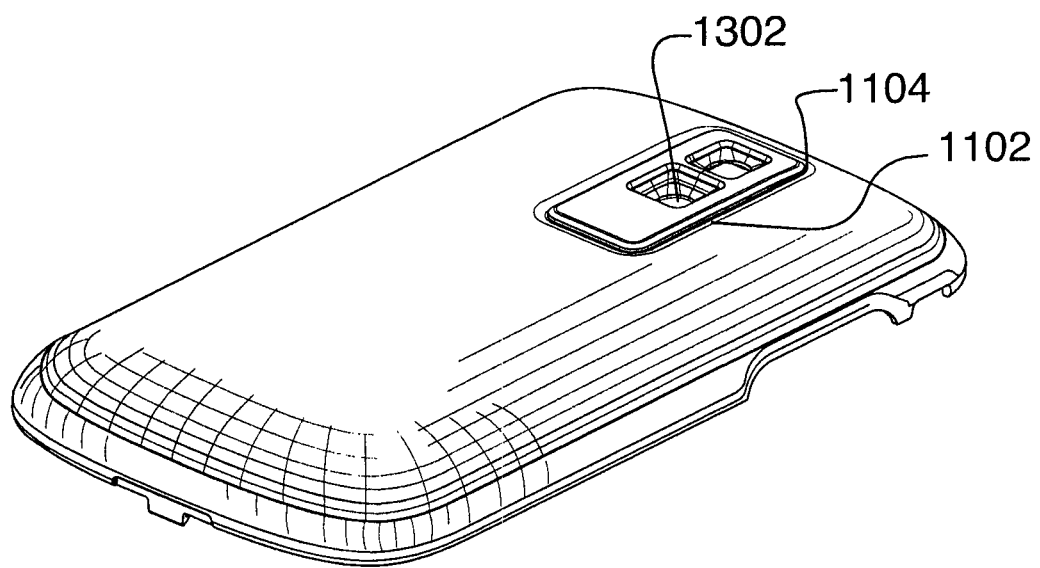
FIG. 13 is a perspective view of the example of the back of FIG. 11, including an additional snap-in feature.

Reference is made to FIG. 11 and FIG. 12 to describe another example of a back according to the present disclosure. The back shown in FIG. 11 and FIG. 12 is similar to the back shown in FIG. 3 and FIG. 4 and is therefore not described again in detail. In the example shown in FIG. 11 and FIG. 12, however, the body 302 includes a void that may be formed, for example, by cutting utilizing the CNC machine. An interior plastic rim 1104 may also be molded around the outer perimeter or edge 1102 of the void. The interior plastic rim 1104 is utilized to facilitate connection to, for example, a camera lens 1302 for a portable electronic device that includes camera functionality, as shown in FIG. 13.

In other examples, rather than the entire back of the portable electronic device, a portion of the back may comprise a body and a rim. For example, a battery cover may comprise a fibrous laminate body and a rim that is coupled to and extends around the edge of the body. In the example of the battery cover, the cover is attachable to the remainder of the back utilizing connectors such as those described above with reference to FIG. 3, FIG. 4, and FIG. 5, for insertion and removal of, for example, a battery and a SIM/RUIM card.

Figure 14:
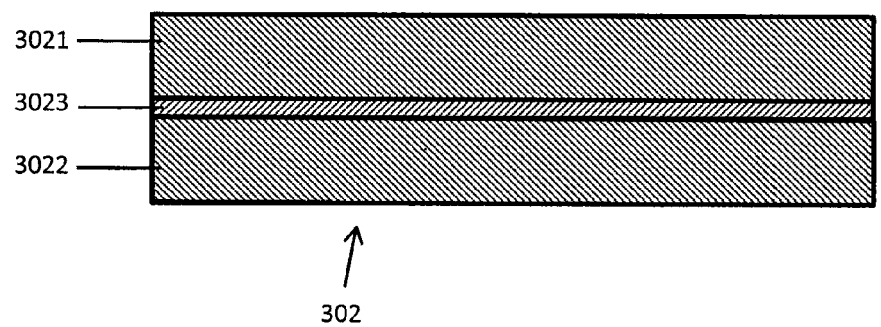
FIG. 14 is a plan view of sheet metal antennas in the back of the portable electronic device.

With reference to FIG. 14, the body 302 may be formed with a first layer 3021 of a laminate fibrous material, a second layer 3022 of a laminate fibrous material and an antenna 3023 embedded between the first layer 3021 and the second layer 3022. The antenna 3023 may be formed as a sheet antenna of metallic material that can be coupled to the communication subsystem 104. The antenna 3023 may be affixed to one or both of the first layer 3021 and the second layer 3022 or, alternatively, may be tightly sandwiched between the first layer 3021 and the second layer 3022. In any case, the antenna 3023 may improve communications between the portable electronic device 100 and the surrounding networks and may permit use of certain RF blocking materials in at least a portion of the body 302 that would not block lines-of-sight to the antenna 3023.

Advantageously, a back portion of the portable electronic device may be made of glass fiber laminate or some other similar laminate or composite material with an overmolded or otherwise affixed rim of plastic. The glass fiber laminate provides mechanical strength, rigidity and dimensional stability. The plastic rim is overmolded around the periphery of the glass fiber laminate and provides interlocking features for cooperating with the housing of the portable electronic device to couple the back portion to the housing. The use of glass fiber laminate provides a portion that is thin relative to a plastic portion, while providing suitable strength, rigidity, and dimensional stability.

According to one aspect, a method of manufacturing a portion of a portable electronic device is provided. The method includes forming a glass fiber laminate sheet to provide a formed glass fiber laminate body, and overmolding a rim on the body. The rim includes a connector for coupling with a complementary part of the portable electronic device.

According to another aspect, a portion of a portable electronic device is provided. The portion includes a glass fiber laminate body, and a plastic rim at an edge of the body, the rim including a connector for coupling with a complementary part of the portable electronic device.

According to still another aspect, a portable electronic device is provided. The portable electronic device includes the above portion.

Figure 15:
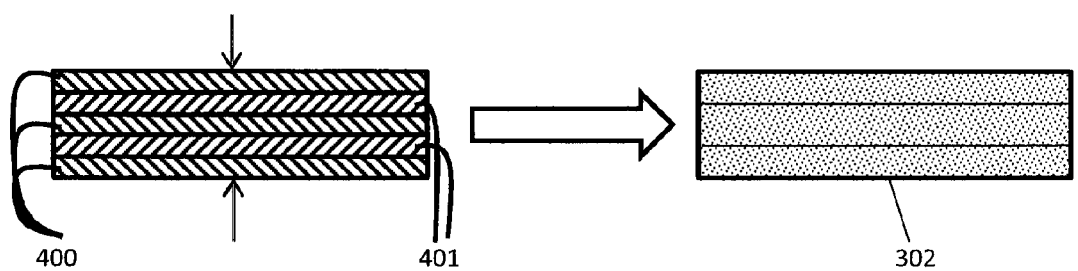
FIG. 15 is a plan view illustrating a method of forming a portion of a portable electronic device.

In accordance with further aspects of the invention and, with reference to FIGS. 15 and 16, methods of manufacturing a portion of a portable electronic device are provided. As shown in FIG. 15, a first one of the methods includes interleaving fibrous weave layers (i.e., 1-3 layers of glass fiber, carbon fiber and nylon) 400 with layers of thermoplastic 401. The interleaved layers are then pressed together and heated and then cooled while under pressure to form the body 302. In this case, the body 302 is formed as a continuous plastic with weave layers suspended or disposed therein. At this point, the method includes providing for a coupling of the body 302 with a complementary part of the portable electronic device as described above and, in some cases, embedding an antenna in the body as described above.

As shown in FIG. 16, a second one of the methods includes disposing fibrous strand sheets 402 in a form mold 403 and then evacuating air from and drawing thermoset material 404 into the mold 403. The thermoset material 404 is then cured to form the body 302. At this point, again, the method includes providing for a coupling of the body 302 with a complementary part of the portable electronic device as described above and, in some cases, embedding an antenna in the body as described above.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

The invention claimed is:

1. A method of manufacturing a portion of a portable electronic device, the method comprising:
   providing a fibrous laminate sheet;
   applying a coating to the fibrous laminate sheet, the coating having a material and a thickness such that the coating does not substantially interfere with radio frequency (RF) functions of the portable electronic device, wherein the coating comprises a non-conductive vacuum metalized (NCVM) coating;
   shaping the fibrous laminate sheet to form a shaped fibrous laminate body; and
   connecting a rim to the shaped fibrous laminate body without molding the rim on the shaped fibrous laminate body, the rim including a connector for coupling with a complementary part of the portable electronic device,
   wherein the shaped fibrous laminate body comprises:
      a substantially flat portion having four edges;
      a projection extending substantially perpendicularly away from the substantially flat portion and adjoining each of the four edges at a curvature; and
      an antenna embedded in the fibrous laminate body, wherein the antenna is formed as a sheet antenna of metallic material configured to couple to a communication subsystem of the portable electronic device, and wherein the fibrous laminate body comprises at least one or more of glass fiber, carbon fiber and nylon.

2. The method according to claim 1, wherein shaping the fibrous laminate sheet comprises heating and/or compression forming.

3. The method according to claim 1, wherein the connecting comprises at least one or more of adhering the rim to the projection of the body and affixing the rim to the projection of the body.

4. The method according to claim 1, further comprising cutting the fibrous laminate body prior to the connecting.

5. The method according to claim 1, wherein the portion of the portable electronic device comprises a back portion.

6. The method according to claim 5, wherein the back portion of the portable electronic device comprises a battery cover.

7. The method according to claim 1, wherein the providing comprises:
   dying or coating woven fabric; and
   setting the dyed woven fabric in a matrix material.

8. The method of claim 1, wherein the curvature of the four edges is configured to define a depth-wise curvature of an interior portion of the portable electronic device.

9. A method of manufacturing a portion of a portable electronic device, the method comprising:
   interleaving fibrous weave layers with thermoplastic layers, wherein the fibrous weave layers comprise at least two layers having sheet metal antennas embedded between a first layer and a second layer;
   applying a coating to the fibrous weave layers, the coating having a material and a thickness such that the coating does not substantially interfere with radio frequency (RF) functions of the portable electronic device, wherein the coating comprises a non-conductive vacuum metalized (NCVM) coating;
   pressing the layers together with heat and pressure;
   cooling the layers while under pressure to form a shaped body of continuous plastic with weave layers therein, wherein the shaped body comprises:
      a substantially flat portion having four edges; and
      a projection extending substantially perpendicularly away from the substantially flat portion and adjoining each of the four edges at a curvature;
   providing for a coupling of the shaped body with a complementary part of the portable electronic device; and
   connecting a rim to the projection of the shaped body without molding the rim on the shaped body.

10. The method according to claim 9, wherein the fibrous weave layers comprise 1-3 layers of one or more of glass fiber, carbon fiber and nylon.

11. The method according to claim 9, wherein the rim includes a connector for coupling with the complementary part.

12. The method according to claim 11, wherein the connecting comprises at least one or more of adhering the rim to the projection of the shaped body and affixing the rim to the projection of the shaped body.

13. The method according to claim 9, wherein an antenna is embedded in the flat portion of the body.

* * * * *